Patented Feb. 20, 1951

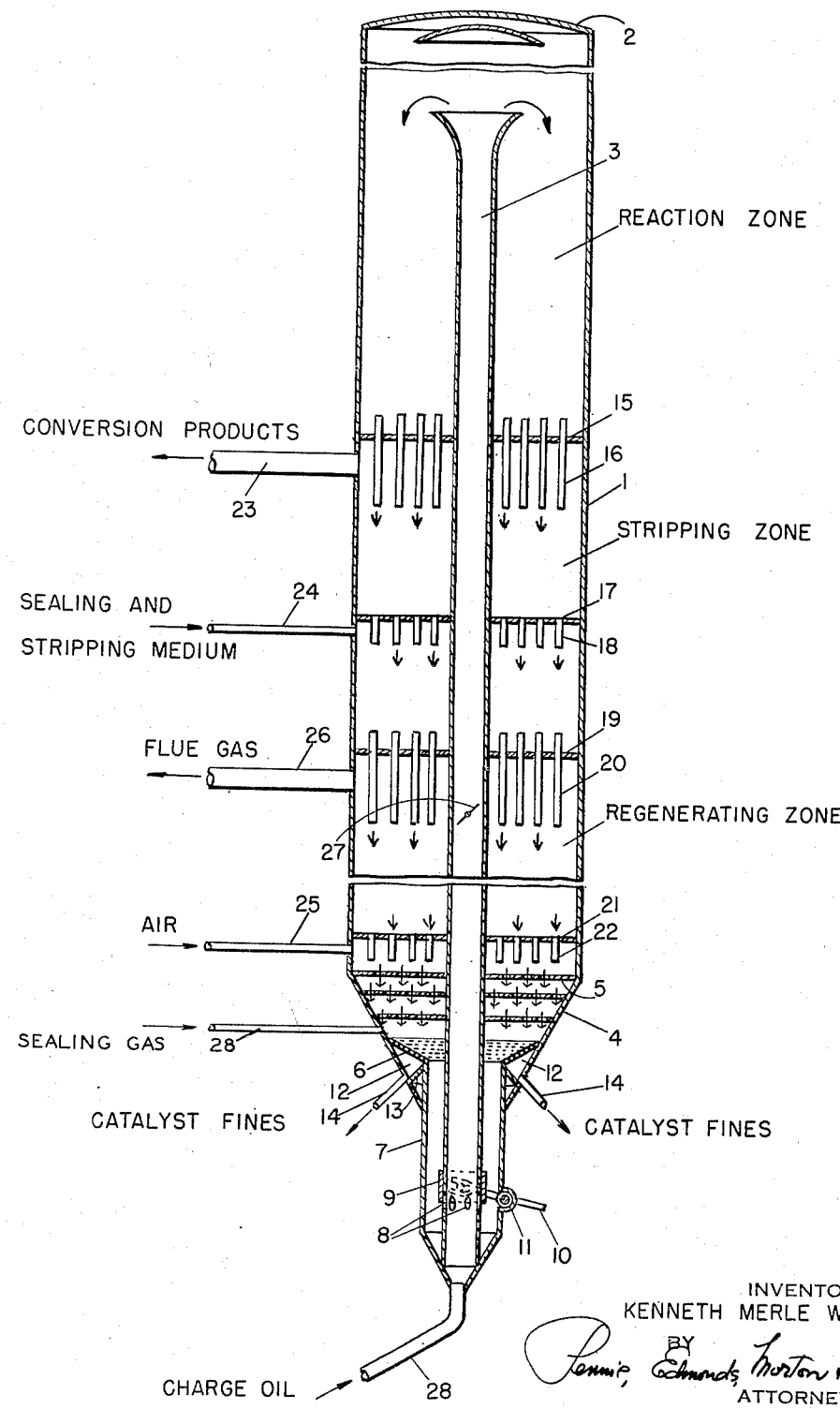

2,542,887

UNITED STATES PATENT OFFICE 2,542,887

APPARATUS FOR PYROLYTIC CONVERSION OF HYDROCARBONS

Kenneth Merle Watson, Madison, Wis., assignor to Sinclair Refining Company, New York, N. Y., a corporation of Maine Application June 27, 1947, Serial No. 757,650

6 Claims. (Cl. 23—288)

This invention relates to the pyroyltic conversion of hydrocarbons and provides improved apparatus especially adapted to use in the carrying out of such conversion processes involving the use of a solid catalyst.

In such operations, a carbonaceous deposit is formed on the solid catalyst during the hydrocarbon conversion and the catalyst must be periodically regenerated to restore its catalytic effectiveness.

In one method of operation previously proposed, the hydrocarbon to be converted is passed in vapor phase continuously upwardly through a downwardly gravitating bed of hot catalyst, in granular or pelleted form, in a vertically elongated conversion chamber. Spent catalyst is continuously withdrawn from the lower end of the conversion chamber, regenerated, and thereafter returned to the upper end of the conversion chamber. The regeneration is effected by burning off the carbonaceous deposit by passing the hot catalyst downwardly through a separate vertically elongated chamber countercurrent to a stream of air.

Such operations have entailed expensive and troublesome mechanical elevator means for conveying the catalyst from the lower end of the conversion chamber to the top of the regenerating chamber and again from the lower end of the regenerating chamber to the top of the conversion chamber. Further two separate chambers have been required for the carrying out of the process.

In my copending application Serial No. 757,645, filed concurrent'y herewith, I have described and claimed an improved method of operation where the difficulties heretofore experienced are avoided. The apparatus of my present invention is especially adapted to the carrying out of said process.

In accordance with my improved process, just noted, the catalyst at an elevated temperature is caused to gravitate, as a single, continuous, vertical elongated bed or column, downwardly through a vertical elongated chamber. In the upper portion of the chamber, the catalyst is intimately contacted with the hydrocarbon vapors to be converted and in the lower portion of the chamber, the carbonaceous deposit formed on the catalyst during the conversion is burned off by contact with air. The regenerated catalyst is passed from the lower end of the vertically elongated chamber, at a controlled rate, into a stream of the hydrocarbon vapors to be converted and is returned thereby in suspension directly to the upper end of the vertically elongated catalyst bed.

The process is especially applicable to hydrocarbon conversion processes in which a bed of granular catalyst, as distinguished from a fluidized body of catalyst, is used. In fluid catalyst processes, there is a tendency toward turbulence of the catalyst in the fluidized bed so that the spent catalyst becomes mixed with the freshly regenerated catalyst resulting in a heterogeneous mixture of catalyst of less than maximum effectiveness. In the use of a bed of coarse grain catalyst, or pelleted catalyst, little or no mixing of the catalyst in the bed is experienced and little or no catalyst is carried by the vapors or gases from a lower or higher zone of the catalyst bed.

In my said process, the regenerating zone is, with advantage, separated from the reaction zone by vapor disengaging means adapted to promote the separation of the hydrocarbon vapors from the catalyst. Advantageously, the catalyst is also stripped of readily vaporizable hydrocarbons in an intermediate zone of the column of catalyst. The present invention provides means for effecting this separation and also provides means for disengaging the products of combustion from the catalyst and for separately withdrawing the hydrocarbon vapors and gaseous products of regeneration from the body of catalyst without substantial intermixing.

The invention provides improved means for carrying out the operation applicable generally to conversion processes of the type described whereby the use of troublesome mechanical elevator means is eliminated, the customary long seal leg at the bottom of the reactor is not required, which is adapted to variation in, and regulations of, space velocities while the operation is in progress, in which a single bed of catalyst is employed and which is subject to operation at high catalyst-oil ratios and substantial adiabatic regeneration of the catalyst. My improved method of operation further results in improved over-all thermal efficiency, and a nicety of control of operating conditions resulting in a high yield and high uniformity of the desired conversion product.

The invention will be more fully described and illustrated with reference to the accompanying drawing which represents a vertical cross-sectional view of a generally cylindrical apparatus, especially adapted to the carrying out of the process.

The apparatus is enclosed by a cylindrical casing 1, advantageously of sheet metal, closed at its upper end by dished-head 2. Coaxially positioned within the chamber is the elevator conduit 3 flared at its upper end, terminating short of the upper end of the cylindrical casing 1 and extending downwardly below the lower end of casing 1.

Projecting from the lower end of casing 1 is truncated conical member 4 fitted interiorly with a plurality of vertically spaced, substantially horizontal perforated plates 5, the perforations in the plate being so positioned as to form an effective vapor lock and to retard the downward passage of the catalyst, on the principle of angle of repose, as understood by the art.

Coaxially positioned in the lower portion of the member 4 is a truncated conical member 6, formed of large mesh wire cloth or perforated sheet metal, the perforations being of such size as to permit the passage of catalyst fines therethrough, while retaining coarser particles of the catalyst.

The member 6 opens at its lower end into a cylindrical member 7, extending through the smaller base of the member 4 and forming an annular chamber about the lower end of the elevator conduit 3, which chamber is connected with the interior of the lower end of conduit 3 through a series of openings 8 in the walls of the conduit 3, the area of the openings being regulable by the sliding collar 9, which is, with advantage, adapted to be adjusted by any suitable means, for instance, lever 10, or the like, extending through the wall of the cylindrical member 7 and supported at 11.

The conical member 6 is surrounded by an annular chamber 12 formed by the walls of the members 4, 6, and a lower partition 13. Conduit 14 leads from the lower end of chamber 12.

The vertically elongated chamber is provided at an intermediate point with a vapor disengaging device consisting essentially of a transverse tray, or plate, 15 through which there extends a plurality of tubes 16, the tubes extending from a point somewhat above the tray to a point substantially below the tray so as to form a vapor disengaging zone just below the tray.

The vertically elongated chamber is further provided at a lower intermediate point with a vapor distributing device consisting essentially of a perforated distributor tray 17 with nipples 18 extending downwardly from the perforations.

At a still lower intermediate point, the chamber is provided with a second vapor disengaging device similar to that just described and consisting essentially of a tray or plate 19 with tubes 20 extending therethrough, as previously described.

At a point just above the lower end of the chamber there is a second vapor distributing device such as that just described and consisting essentially of a perforated distributor tray 21 and downwardly extending nipples 22.

In place of the particular vapor disengaging and distributing devices shown, other types of vapor disengaging and distributing means may be employed.

In operation, the vertically elongated chamber is filled with catalyst to a level about equal to the height of the upper end of the elevator conduit 3 by any suitable means, not shown, such as an opening in the upper end of the chamber adapted to be sealed during operation. The catalyst is heated to the conversion temperature, either before or after being charged to the system, by any conventional means.

The hydrocarbon to be converted is charged in vapor phase through line 28 into the lower end of elevator conduit 3 and passes upwardly through the conduit carrying with it in suspension catalyst flowing into the lower end of conduit 3 through the openings 8.

The catalyst is thus carried in suspension in the hydrocarbon vapors upwardly through the elevator conduit and passes from the upper end thereof onto the upper surface of the catalyst bed in the reaction zone of the chamber.

The hydrocarbon vapors pass downwardly through the bed of hot catalyst in the reaction zone and passes, together with the catalyst, through tubes 16 into the stripping zone. The catalyst passing from the lower ends of tubes 16, continues downwardly through the stripping zone, leaving a vapor space between the lower side of plate 15 and the lower end of tubes 16. The vapors become disengaged from the catalyst, collect in the said vapor space and are withdrawn therefrom through conduit 23.

A sealing and stripping gaseous medium is introduced through conduit 24 to the zone just beneath plate 17 and passes therefrom upwardly through nipples 18 in contact with the catalyst in the stripping zone. Advantageously, a somewhat higher pressure is maintained in the stripping zone than in the vapor disengaging zones and the sealing gas, advantageously steam, being under high pressure serves to prevent the mixing of flue gases from the regenerating zone with hydrocarbon vapors from the reaction zone, as well as serving to strip hydrocarbon vapors from the downwardly gravitating catalyst.

Air is introduced through conduit 25 to the zone just beneath the distributing tray 21, passes upwardly through nipple 22 and upwardly through the regenerating zone in contact with the hot catalyst, resulting in the burning from the catalyst carbonaceous deposits formed thereon during the hydrocarbon conversion. The catalyst flows from the stripping zone through tubes 20 to the regenerating zone leaving a vapor disengaging zone just beneath tray 19 from which the gaseous products of combustion, that is, flue gases from the regenerating zone, are withdrawn through conduit 26.

The velocity of the vapors flowing upwardly through the elevator conduit 3, as previously noted, should be such as will entrain and carry the catalyst upwardly through the conduit. The optimum vapor velocity through the conduit will depend somewhat from the size and density of the catalyst and the desired oil-catalyst ratio. Generally, velocities within the range of 10 to 50 feet per second will be found satisfactory and the transverse area of the elevator conduit should be so correlated with the intended feed rate as to give velocities within this range.

Operating conditions generally are subject to considerable variations depending upon the particular catalyst employed and the nature and the extent of the desired reaction. Various types of catalyst may be used, for instance, natural or synthetic earths, silica gels, and the like, or various inert carriers having active catalyst deposited thereon. The size of the particles of catalyst is, with advantage, of a mesh within the range of 25 to 40, though catalyst of larger or smaller particle size may be employed. Pelleted catalyst as coarse as 4 to 10 mesh may be employed.

In cracking gas oil, for instance, using a silica-alumina type catalyst, the temperature in the reaction zone is, with advantage, maintained within the range of about 800° to 1,000° F. In the regenerating zone, a temperature within the range of 900° to 1,150° F. is usually satisfactory. Where required, conventional methods may be employed for extracting heat from the regenerating zone so as to avoid over-heating of the catalyst.

Pressure within the reaction zone is advantageously maintained within the range of about 5 to 25° F. and the pressure differential throughout the system should be such as to effect a flow substantially as described. The pressure drop through the elevator conduit 3 may, by butterfly valve 27, be controlled independently of the pressure of the oil charge.

Advantageously, oil is charged to the operation at a pressure of about 30 pounds per square inch. Pressure at the upper part of the reaction zone may be maintained at about 20 pounds per square inch and the exit pressure of the hydrocarbon vapors may be about 10 pounds per square inch. Under such conditions, regenerating air is introduced into the lower zone of the chamber at a pressure of about 30 pounds per square inch. Exit pressure of the flue gases is, with advantage, approximately that of the exit pressure of the hydrocarbon vapors. Steam, or other inert gas, used as the sealing or stripping medium would be passed to the stripping zone at a pressure slightly above the exit pressures of the flue gas and hydrocarbon vapor, say, a pressure of about 11 pounds per square inch under such conditions of operation.

Catalyst fines formed by attrition of the catalyst during repeated circulation through the system are separated from the catalyst in passing over the inclined perforated screens 6 and fall into chamber 12 from which they are withdrawn through lines 14.

The temperature in the reaction zone is controlled in large measure by the temperature of the catalyst passing into the stream of hydrocarbon charge vapors and also by the extent of the preheat of the charge oil. The temperature of the catalyst passing from the regenerating zone may, likewise, be controlled by the extraction of heat from the regenerating zone by conventional means.

I claim:

1. Apparatus of the type described comprising a vertically elongated cylindrical chamber adapted to hold a bed of solid catalyst, closed at its upper end and terminating at its lower end in a truncated conical member fitted interiorly with a plurality of vertically spaced, substantially horizontal, perforated plates, and a second truncated conical member formed of wire cloth of a mesh smaller than the particle size of the catalyst to be used in the apparatus but adapted to pass catalyst fines, said second truncated conical member being so constructed and arranged in the lower portion of the first said truncated conical member beneath the perforated plates as to form an annular chamber between its wall and the wall of the first said truncated conical member closed at its upper side by the juncture of the walls of the two conical members, a coaxially arranged cylindrical chamber of substantially the diameter of and extending downwardly from the smaller base of the inner truncated conical member, a vertically disposed elevator conduit coaxially positioned in the chamber and appendages thereto terminating at its upper end below the upper end of the chamber and extending through the lower cylindrical chamber, the walls of said elevator conduit being so perforated adjacent its lower end as to permit the passing of catalyst from the lower cylindrical chamber into said conduit, conduit means adapted to deliver hydrocarbon vapors under pressure to the lower end of the elevator conduit, vapor disengaging means positioned in an intermediate zone of the upper cylindrical chamber, a second vapor disengaging means positioned in a lower intermediate zone of the chamber, conduit means adapted to the separate withdrawal of gaseous media from the respective disengaging means, conduit means adapted to the delivery of air under pressure to the lower zone of the chamber and an outlet from the annular chamber for withdrawal of catalyst fines.

2. Apparatus of the type described comprising a vertically elongated cylindrical chamber adapted to hold a bed of solid catalyst, closed at its upper end and terminating at its lower end in a truncated conical member fitted interiorly with a second truncated conical member formed of wire cloth of a mesh smaller than the particle size of the catalyst to be used in the apparatus but adapted to pass catalyst fines, said second truncated conical member being so constructed and arranged in the lower portion of the first said truncated conical member as to form an annular chamber between its wall and the wall of the first said truncated conical member closed at its upper side by the juncture of the walls of the two conical members, a coaxially arranged cylindrical chamber of substantially the diameter of and extending downwardly from the smaller base of the inner truncated conical member, a vertically disposed elevator conduit coaxially positioned in the chamber and appendages thereto terminating at its upper end below the upper end of the chamber and extending through the lower cylindrical chamber, the walls of said elevator conduit being so perforated adjacent its lower end as to permit the passing of catalyst from the lower cylindrical chamber into said conduit, conduit means adapted to deliver hydrocarbon vapors under pressure to the lower end of the elevator conduit, vapor disengaging means positioned in an intermediate zone of the upper cylindrical chamber, a second vapor disengaging means positioned in a lower intermediate zone of the chamber, conduit means adapted to the separate withdrawal of gaseous media from the respective disengaging means, conduit means adapted to the delivery of air under pressure to the lower zone of the chamber and an outlet from the annular chamber for withdrawal of catalyst fines.

3. The apparatus of claim 2 further characterized by a gas distributing means in a zone of the chamber intermediate the vapor disengaging means.

4. The apparatus of claim 2 further characterized by a sliding collar valve adapted to regulate the rate of flow of catalyst through the perforations adjacent to the lower end of the elevator conduit.

5. The apparatus of claim 2 further characterized by gas distributing means in the lower zone of the main chamber connected with the conduit for delivering air to the lower zone of the chamber.

6. The apparatus of claim 2 further characterized by a damper interposed in the elevator conduit and adapted to regulate the flow therethrough.

KENNETH MERLE WATSON.

REFERENCES CITED

The following references are of record in the file of this patent:

UNITED STATES PATENTS

| Number | Name | Date |
| --- | --- | --- |
| 2,290,580 | Degnen et al. | July 21, 1942 |
| 2,412,152 | Huff | Dec. 3, 1946 |
| 2,418,679 | Utterback | Apr. 8, 1947 |
| 2,440,475 | Jacomini | Apr. 27, 1948 |